United States Patent
Motoi et al.

(10) Patent No.: US 9,244,567 B2
(45) Date of Patent: Jan. 26, 2016

(54) ELECTRONIC APPARATUS, CALIBRATION METHOD AND STORAGE MEDIUM

(71) Applicant: KABUSHIKI KAISHA TOSHIBA, Minato-ku, Tokyo (JP)

(72) Inventors: Shigeru Motoi, Kokubunji (JP); Toshiya Takano, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 20 days.

(21) Appl. No.: 14/094,456

(22) Filed: Dec. 2, 2013

(65) Prior Publication Data

US 2014/0320461 A1 Oct. 30, 2014

(30) Foreign Application Priority Data

Apr. 24, 2013 (JP) ................................. 2013-091487

(51) Int. Cl.
G06F 3/041 (2006.01)
G06F 3/0488 (2013.01)

(52) U.S. Cl.
CPC .......... *G06F 3/0418* (2013.01); *G06F 3/04883* (2013.01)

(58) Field of Classification Search
None
See application file for complete search history.

(56) References Cited

U.S. PATENT DOCUMENTS

| | | | | |
|---|---|---|---|---|
| 6,529,189 | B1* | 3/2003 | Colgan et al. | 345/179 |
| 2006/0007177 | A1* | 1/2006 | McLintock | 345/173 |
| 2011/0032197 | A1 | 2/2011 | Iida | |
| 2012/0027267 | A1* | 2/2012 | Kim et al. | 382/118 |

FOREIGN PATENT DOCUMENTS

| | | |
|---|---|---|
| JP | 2008-276310 A | 11/2008 |
| JP | 2011-054154 A | 3/2011 |
| JP | 2012-234476 A | 11/2012 |

* cited by examiner

*Primary Examiner* — Joseph Haley
*Assistant Examiner* — Ifedayo Iluyomade
(74) *Attorney, Agent, or Firm* — Knobbe, Martens, Olson & Bear, LLP

(57) ABSTRACT

According to one embodiment, an electronic apparatus includes a display processor and a controller. The display processor is configured to display an object on a touch screen display. The object includes a first line segment and a second line segment which is not parallel to the first line segment. The controller is configured to acquire first positional data from a first trace of the first line segment on the touch screen and second positional data from a second trace of the second line segment on the touch screen. The controller is further configured to set a correction value for correcting a deviation between a display position of traces and a detection position of a touch input on the touch screen display, by using the first and second positional data.

17 Claims, 8 Drawing Sheets

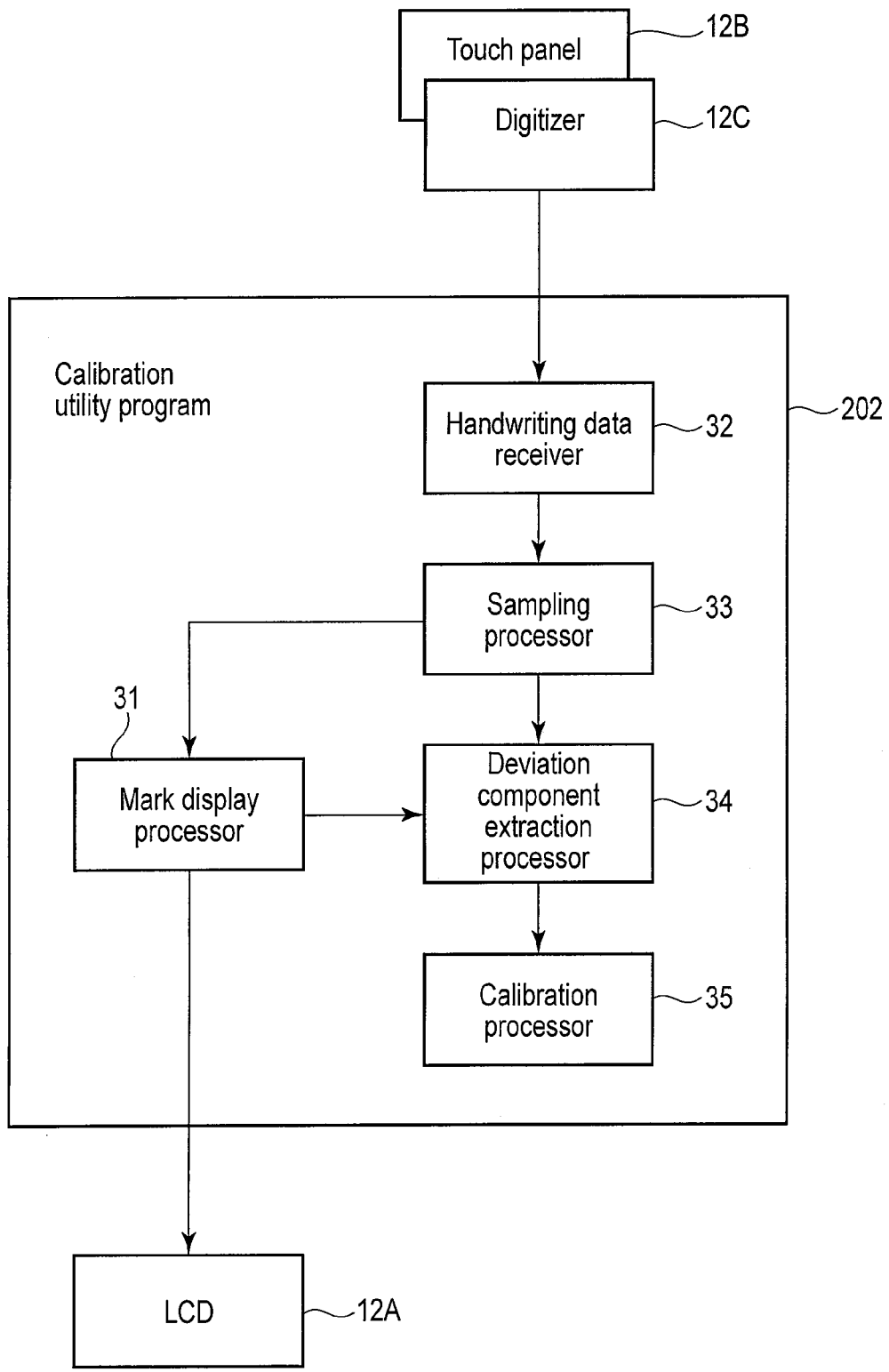
F I G. 3

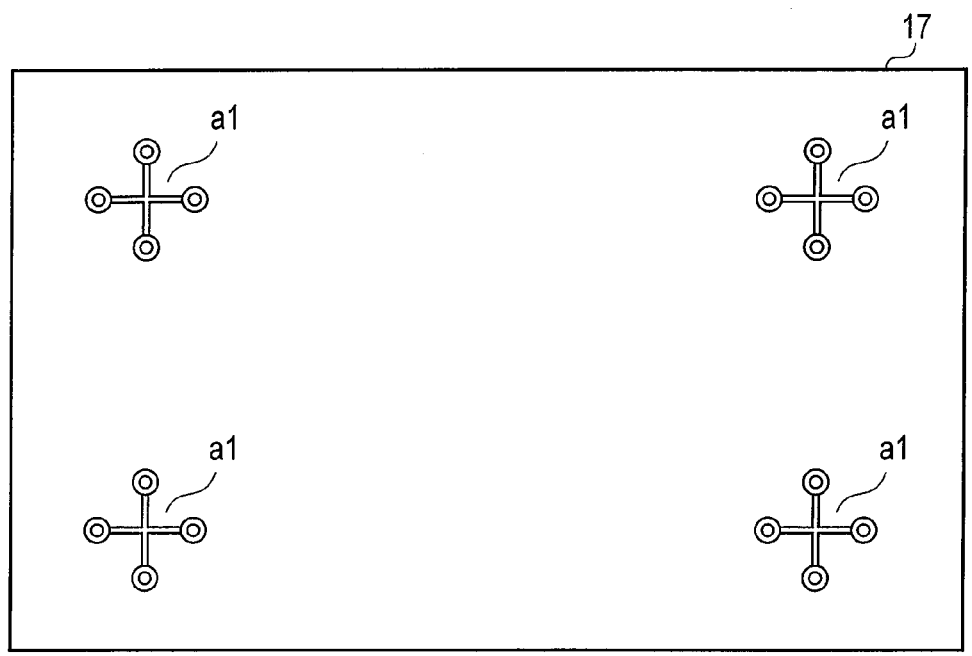
F I G. 11
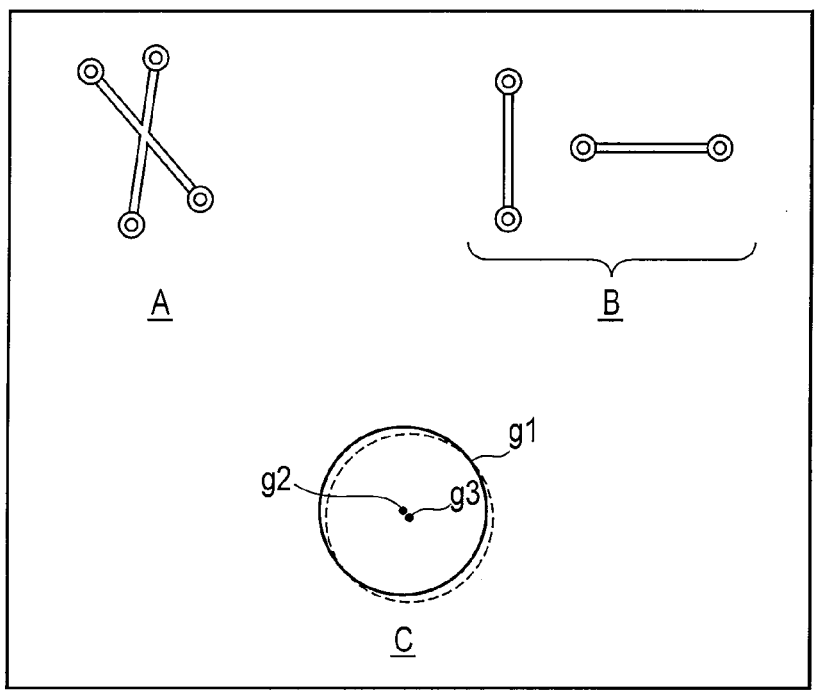
F I G. 12

ELECTRONIC APPARATUS, CALIBRATION METHOD AND STORAGE MEDIUM

CROSS-REFERENCE TO RELATED APPLICATIONS

This application is based upon and claims the benefit of priority from Japanese Patent Application No. 2013-091487, filed Apr. 24, 2013, the entire contents of which are incorporated herein by reference.

FIELD

Embodiments described herein relate generally to a calibration technique of a touch screen display of an electronic apparatus such as a tablet computer and the like.

BACKGROUND

In recent years, various kinds of electronic apparatuses such as a tablet computer, smartphone, and the like which are portable and battery-operable have been developed. Generally, such an electronic apparatus includes a touch screen display for easier input operation by a user.

A user touches an icon or a menu displayed on a touch screen display with his/her finger or a stylus to instruct an electronic apparatus to execute functions associated with the icon or the menu.

Here, various improvements have been proposed for better touch operation on the touch screen display.

The touch screen display includes a flat panel display and a touch panel configured to detect a contact position of the stylus or finger on the screen. Thus, in general, a correction value (of the detection position on the touch panel) is set so that the display position on the flat panel display and the detection position on the touch panel can coincide. Such a setting process is referred to as, for example, calibration. Calibration is effective in compensating for characteristics of each user such as the angle of viewing the touch screen display and the way of using a stylus, etc.

The calibration of a touch screen display is performed by indicating an object such as a dot or cross on a flat panel display and detecting on a touch panel a position of a user's touch operation with respect to the object.

For more accurate calibration, it is preferable that data to calculate the correction value are collected as much as possible. However, forcing the user to repeat the touch operation again and again only for better calibration is not practical.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary view showing functional blocks of a calibration utility program operable on the electronic apparatus of the embodiment.

FIG. 11 is an exemplary view showing an example of a case where a plurality of marks for calibration are displayed by the electronic apparatus of the embodiment.

FIG. 12 is an exemplary view showing an example of transformation marks for calibration displayed by the electronic apparatus of the embodiment.

DETAILED DESCRIPTION

Various embodiments will be described hereinafter with reference to the accompanying drawings.

In general, according to one embodiment, an electronic apparatus includes a display processor and a controller. The display processor is configured to display an object on a touch screen display. The object includes a first line segment and a second line segment which is not parallel to the first line segment. The controller is configured to acquire first positional data from a first trace of the first line segment on the touch screen and second positional data from a second trace of the second line segment on the touch screen. The controller is further configured to set a correction value for correcting a deviation between a display position of traces and a detection position of a touch input on the touch screen display, by using the first and second positional data.

Figure 1:
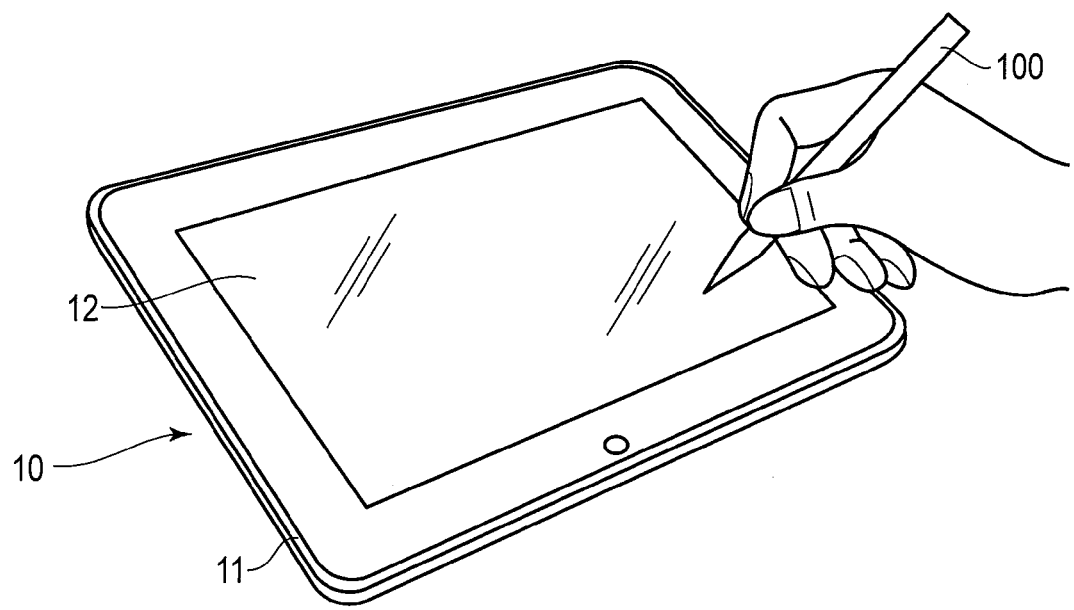
FIG. 1 is an exemplary view showing a perspective view of an exterior of an electronic apparatus of an embodiment.

The electronic apparatus of the embodiment may be achieved as a portable electronic apparatus which accepts a touch input by a finger or stylus, namely, a tablet computer, notebook computer, smartphone, PDA, or the like. FIG. 1 is an exemplary view showing a perspective view of an exterior of the electronic apparatus of the embodiment. As shown in FIG. 1, here discussed is a case where the electronic apparatus of the present embodiment is achieved as a tablet computer 10. The tablet computer 10 includes a main body 11 and a touch screen display 12. The touch screen display 12 is attached to the upper surface of the main body 11 to overlap therewith.

The main body 11 has a thin box-shaped casing. In the touch screen display 12, a flat panel display and a sensor configured to detect a contact position of a finger or stylus on a screen of the flat panel display are incorporated. The flat panel display is, for example, a liquid crystal display (LCD). The sensor is a capacitive touch panel, an electromagnetic induction digitizer, and the like. Hereinafter, a case where both sensors of touch panel and digitizer are incorporated into the touch screen display 12 is discussed.

Each of the touch panel and digitizer is utilized to cover the screen of the flat panel display. On the screen, the touch screen display 12 detects not only a touch input by a finger but also a touch input by a stylus 100. The stylus 100 is an electromagnetic induction stylus, for example. A user can perform handwritten input on the touch screen display 12 with his/her finger or stylus 100. A path of the handwriting by the finger or stylus 100 is displayed on the screen.

Figure 2:
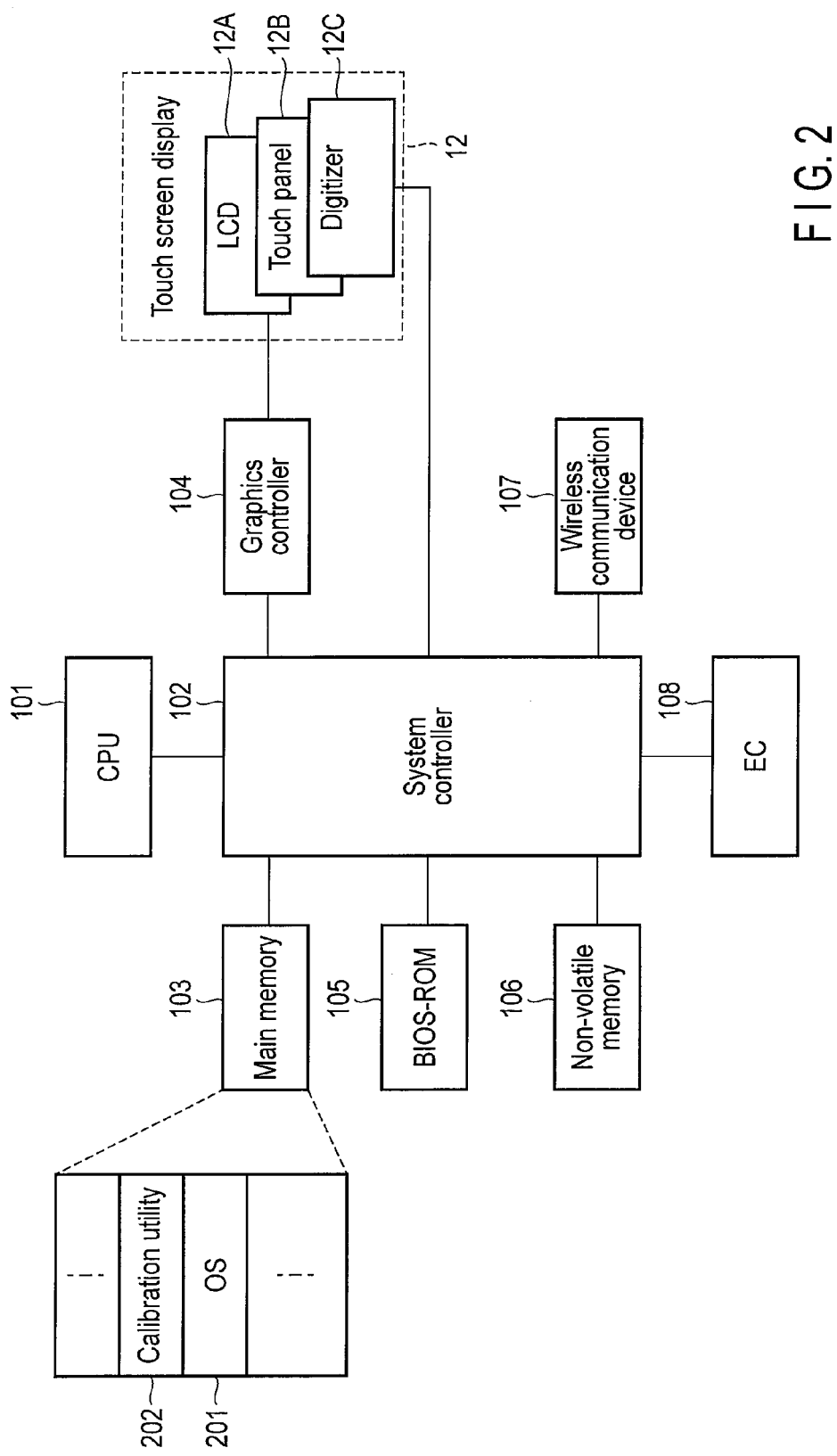
FIG. 2 is an exemplary view showing a system configuration of the electronic apparatus of the embodiment.

FIG. 2 is an exemplary view showing a system configuration of the tablet computer 10.

The tablet computer 10 is, as shown in FIG. 2, includes a CPU 101, a system controller 102, a main memory 103, a graphics controller 104, a BIOS-ROM 105, a non-volatile memory 106, a wireless communication device 107, an embedded controller (EC) 108, and the like.

The CPU 101 is a processor configured to control operation of each module in the tablet computer 10. The CPU 101 executes various software programs loaded from the non-volatile memory 106 into the main memory 103. The software programs include an operating system (OS) 201, calibration utility program 202 operable under the control of the OS 201, and the like. The calibration utility program 202 is a program to perform calibration between the display position of the flat panel display and the detection position detected by the sensor. The tablet computer 10 enables to perform the calibration of the touch screen display 12 efficiently by uses of the calibration utility program 202. See below for further details.

Furthermore, the CPU 101 executes a basic input/output system (BIOS) stored in a BIOS-ROM 105. The BIOS is a program to perform hardware control.

The system controller 102 is a device configured to connect a local bus of the CPU 101 to various components. In the system controller 102, a memory controller configured to perform access control of the main memory 103 is contained. The system controller 102 is configured to execute communication with the graphics controller 104 via a serial bus conforming to the PCI EXPRESS standard.

The graphics controller 104 is a display controller configured to control an LCD 12A used as a display monitor of the tablet computer 10. A display signal generated by the graphics controller 104 is transmitted to the LCD 12A. The LCD 12A displays a screen image based on the display signals. The touch panel 12B and digitizer 12C are placed on the LCD 12A. The touch panel 12B is a capacitive pointing device configured to perform input on the screen of the LCD 12A. The contact position of a finger is detected by the touch panel 12B. The digitizer 12C is an electromagnetic induction pointing device configured to perform input on the screen of the LCD 12A. The contact position of the stylus 100 on the screen is detected by the digitizer 12C.

The wireless communication device 107 is a device configured to execute wireless communication via a wireless LAN, 3G cellular communication, or the like. The EC 108 is a single-chip microcomputer including an embedded controller for power management. The EC 108 is configured to turn on/off the power of the tablet computer 10 based on the user's operation of a power button.

Now, the calibration utility program 202 operable on the tablet computer 10 having the above-described system is explained. FIG. 3 is an exemplary view showing functional blocks of the calibration utility program 202.

As shown in FIG. 3, the calibration utility program 202 includes a mark display processor 31, a handwriting data receiver 32, a sampling processor 33, a deviation component extraction processor 34, and a calibration processor 35.

Figure 4:
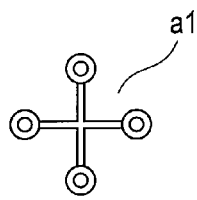
FIG. 4 is an exemplary view showing an exemplary calibration mark displayed by the calibration utility program operable on the electronic apparatus of the embodiment.

The mark display processor 31 is a module configured to display a mark (object) for calibration on the touch screen display 12 (LCD 12A). The mark display processor 31 is configured to display an object unique to the tablet computer 10 for instructing a user to write two or more line segments, which are not parallel to one another. Here, the mark display processor 31 is regarded as one shown in FIG. 4 which displays the object a1 to prompt a user to write two line segments; one vertical and one horizontal. Here, the vertical and horizontal lines crossing each other may be displayed at the same time as the object a1, or a single horizontal or vertical line may be displayed firstly and, after the input thereof has been completed by the user, the other vertical or horizontal line may be displayed.

Figure 5:
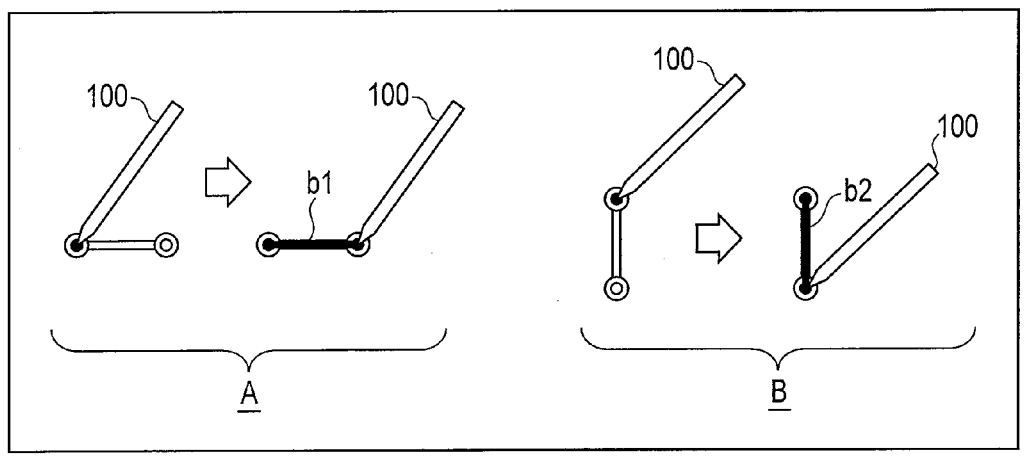
FIG. 5 is an exemplary view showing how writing is performed along the calibration mark on the touch screen display, the calibration mark displayed by the calibration utility program operable on the electronic apparatus of the embodiment.

When the object a1 is displayed, the user writes the two line segments on the touch screen display 12 tracing the object a1 as shown in FIG. 5. In FIG. 5, b1 shows a trace of the handwritten input by the user. As mentioned above, the touch screen display 12 detects the touch operation on the screen via the touch panel 12B or digitizer 12C. The handwriting data receiver 32 is a module configured to receive a detection signal output from the touch panel 12B or digitizer 12C. The detection signal output from the touch panel 12B or digitizer 12C includes coordinate data. Not shown in FIG. 3, the calibration utility program 202 includes a module to display a trace of a handwritten input based on the coordinate data on the touch screen display 12.

Figure 6:
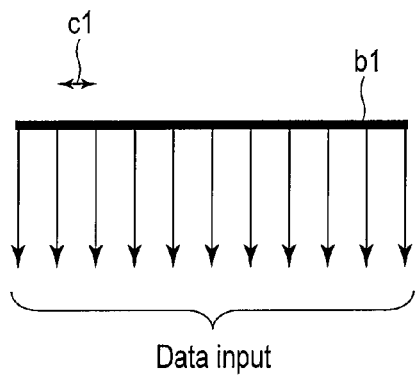
FIG. 6 is an exemplary view for explaining a principle on which the calibration utility program collects the data for calibration, the calibration utility program operable on the electronic apparatus of the embodiment.

Now, given that the touch panel 12B and digitizer 12C execute the detection of touch operation at a frequency of 100 Hz, if a line segment (b1) is written as shown in FIG. 6, a hundred detection signals are output per second, that is, a detection signal is output per 10 ms (c1). Thus, the calibration utility program 202 collects many detection signals from a single writing by the user.

A plurality of detection signals received by the handwriting data receiver 32 are supplied to the sampling processor 33. The sampling processor 33 is a module configured to select detection signals used for the calibration from the plurality of detection signals supplied from the handwriting data receiver 32. See below for detailed working mechanism of the sampling processor 33.

The detection signals selected from the sampling processor 33 are supplied to the deviation component extraction processor 34. The deviation component extraction processor 34 is a module configured to extract components concerning deviation between the display position of the object a1 on the touch screen display 12 (LCD 12A) and the detection position of writing along the object a1 on the touch screen display 12 detected by the touch panel 12B or digitizer 12C. Here, referring to FIG. 7, the basic principle of the deviation component extraction process executed by the deviation component extraction processor 34 is explained.

As mentioned above, the detection signal output from the touch panel 12B or digitizer 12C includes the coordinate data. The coordinate data indicates on what position of the touch screen display 12 the touch operation corresponding to the coordinate data is performed. However (unlike a case where a touch operation is performed as to a dot-shaped object, for example), when the detection signal is acquired from the user's handwritten tracing the line segment of the object a1 displayed on the touch screen display 12, the detection signal includes the position of the touch operation represented by the coordinate data, and it is unclear from what position on the line segment of the object a1 the position is obtained. Considering this point, the deviation component extraction processor 34 estimates that a position on the line segment directly crossing the detection position of the touch operation is the position of the touch operation.

Figure 7:
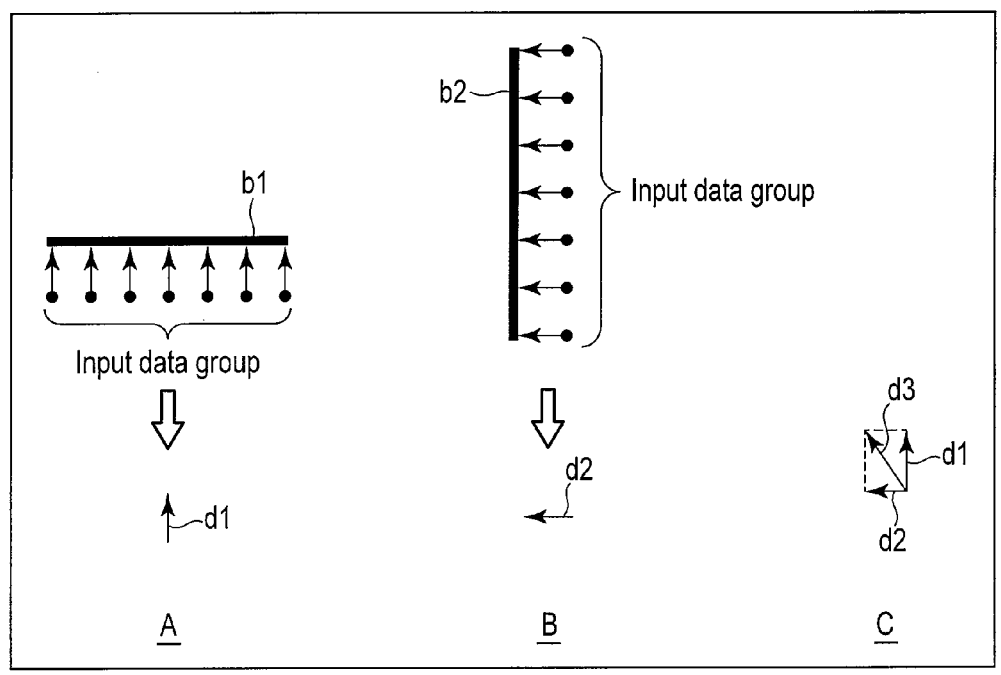
FIG. 7 is an exemplary view for explaining a principle on which the calibration utility program extracts deviation components, the calibration utility program operable on the electronic apparatus of the embodiment.

The deviation component extraction processor 34 estimates a position on the line segment corresponding to each position of the touch operation, and then calculates a distance of each pair of positions together with an average value thereof. Thereby, as shown in FIG. 7, the calibration utility program 202 calculates the vertical directional deviation component (d1) based on a plurality of detection signals from a single horizontal line of handwriting on the touch screen display 12 ("A" in FIG. 7), and further calculates the horizontal directional deviation component (d2) based on a plurality of detection signals from a single vertical line of handwriting on the touch screen display 12 ("B" in FIG. 7). In addition, from the deviation components of both horizontal and vertical directions, a correction value (d3) is calculated so that the display position of the touch screen display 12 (LCD 12A) and the detection position of the touch screen display 12 (touch panel 12B or digitizer 12C) coincide ("C" in FIG. 7).

The calibration processor 35 calculates the correction value based on the deviation components extracted from the deviation component extraction processor 34 so that the display position on the touch screen display 12 (LCD 12A) and the detection position on the touch screen display 12 (touch panel 12B and digitizer 12C) coincide.

As described above, the contact position of the stylus 100 on the touch screen display 12 is detected by the digitizer 12C which is a capacitive pointing device. The contact position detected by the digitizer 12C may vary with a contact angle of the stylus 100 on the touch screen display 12 even when the contact position is at the same position on the touch screen display 12. Therefore, the length of the line segment represented by the object a1 displayed by the mark display processor 31 is set to be within such a range that the contact angle of the stylus 100 does not significantly change (beyond a threshold value) while the line segment is being written.

Now, the working mechanism of the sampling processor 33 is described.

Figure 8:
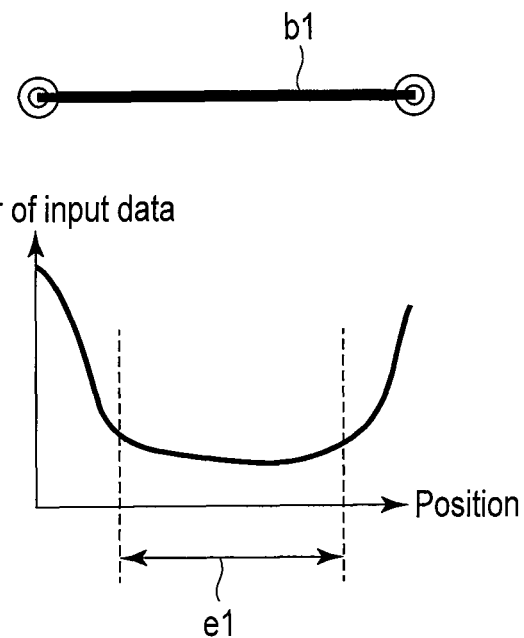
FIG. 8 is an exemplary view for explaining a principle on which the calibration utility program selects the data for calibration, the calibration utility program operable on the electronic apparatus of the embodiment.

When a line segment is written, for example, along the object a1 by the stylus 100 on the touch screen display 12, the contact of the stylus 100 on the touch screen display 12 would often become longer at both start point and finish point of the writing of the line segment b1 as shown in FIG. 8. This means that the detection signals acquired therefrom would be biased to those corresponding to the start and finish points of the writing of the line segment b1. Therefore, the sampling processor 33 uses, from the detection signals acquired from the start point to the finish point of the writing of the line segment b1, a temporal middle part (e1) thereof for the selection of the detection signals used for the calibration. Here, the sampling processor 33 may use a positional middle part between the start and finish points of the writing of the line segment b1 for the selection of the detection signals used for the calibration. Furthermore, a process to eliminate points which are substantially motionless as compared to their preceding sample points may be performed before/after the above selection process. Thereby, the sampling processor 33 causes the deviation component extraction processor 34 to extract the deviation components from the detection signals collected without bias.

Figure 9:
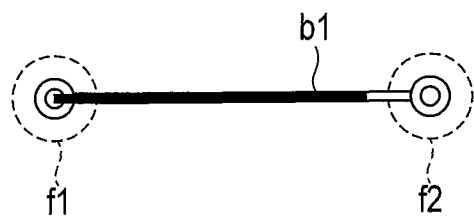
FIG. 9 is an exemplary view for explaining a principle on which the calibration utility program determines whether the data for calibration is suitable or not, the calibration utility program operable on the electronic apparatus of the embodiment.

Moreover, the sampling processor 33 determines suitability of the written line segment b1; that is, validity of executing the calibration based on the detection signals acquired from the writing of the line segment b1. If the start point or finish point of the writing of the line segment b1 by the user is, for example, significantly far (beyond a threshold value) from the start or finish point of the line segment represented by the object a1 as shown in FIG. 9, the sampling processor 33 determines that the writing of the line segment b1 is invalid and requests the mark display processor 31 to regenerate the object a1 on the touch screen display 12. When the mark display processor 31 regenerates the object a1, the trace of the handwriting displayed previously is erased.

In the example shown in FIG. 9, the start point of the writing of the line segment b1 is within the threshold distance range (f1) of the start point of the line segment represented by the object a1 while the finish point of the writing of the line segment b1 is outside the threshold distance range (f2) of the finish point of the line segment represented by the object a1. Thus, the writing of the line segment b1 is determined invalid, and the object a1 is regenerated on the touch screen display 12 by the mark display processor 31.

Thus, such undesired calibration based on a falsely-written line segment due to, for example, cancellation of the writing by the user can be prevented. Furthermore, even when an unnecessarily long line segment is written by a user, such a long line segment is determined invalid and thus, an undesired calibration process performed for a long time due to massive data volume of such a long line segment can be prevented.

Figure 10:
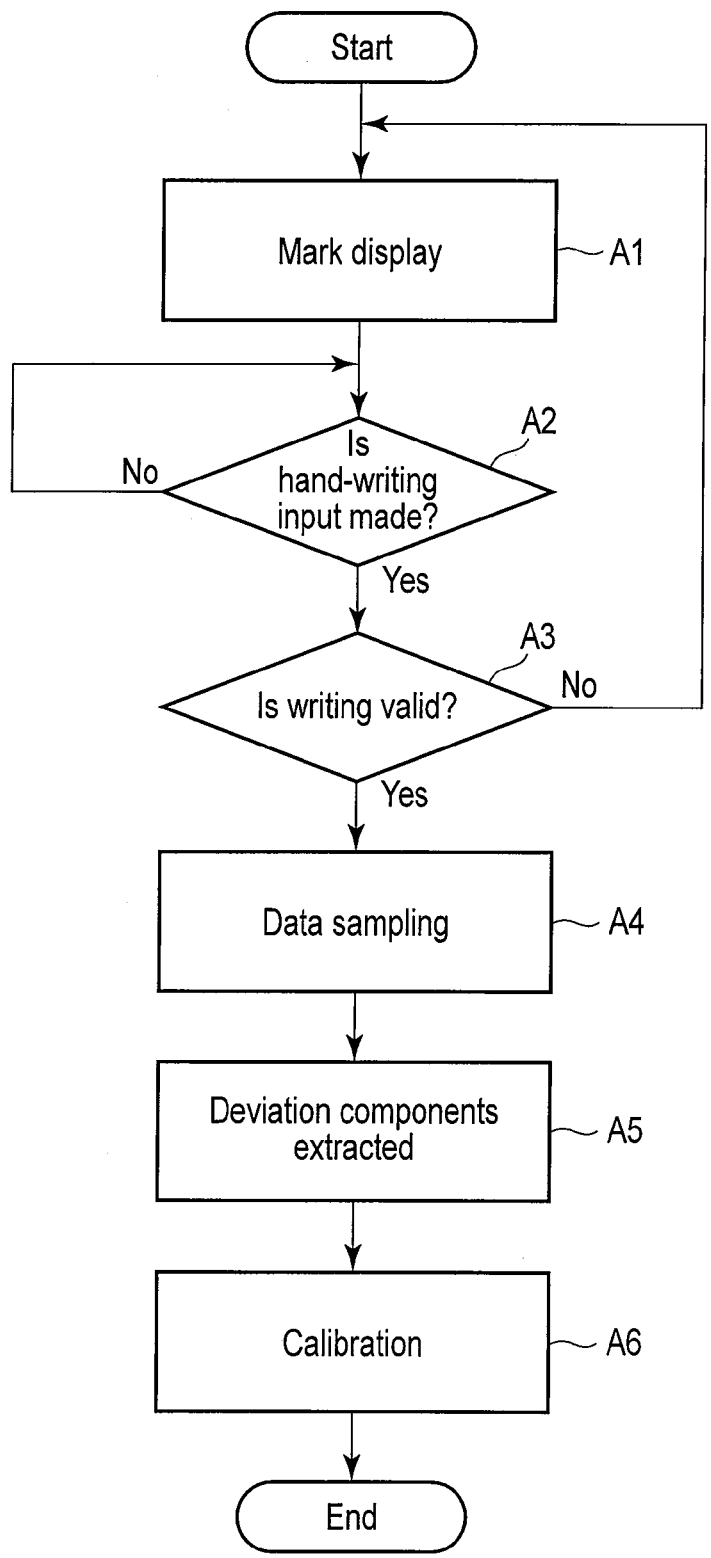
FIG. 10 is an exemplary flowchart showing a procedure for a calibration of a touch screen display of the electronic apparatus of the embodiment.

FIG. 10 is an exemplary flowchart showing a procedure for the calibration of the touch screen display 12 of the tablet computer 10 of the present embodiment.

When the calibration of the touch screen display 12 (between the LCD 12A, and the touch panel 12B and digitizer 12C) is performed, the tablet computer 10 firstly displays a mark (object) used for writing two or more line segments which are not parallel to one another (Block A1).

The tablet computer 10 monitors the writing of the line segments; that is, watches whether or not a handwritten input has been performed on the touch screen display 12 (Block A2), and if the handwritten input has been performed (Yes in Block A2), then determines whether or not the written line segments are valid (Block A3). If the line segments are determined invalid (NO in Block A3), the tablet computer 10 returns to Block A1 and executes the regeneration of the mark on the touch screen display 12. On the other hand, if the line segments are determined valid, the tablet computer 10 selects detection signals for the calibration from the detection signals acquired by the writing of the line segment (Block A4).

The tablet computer 10 uses the selected detection signals to extract the deviation components of the touch screen display 12 (between the LCD 12A and the touch panel 12B and digitizer 12C) (Block A5), and sets the correction value by which the display position of the touch screen display 12 (LCD 12A) and the detection position of the touch screen display 12 (touch panel 12B or digitizer 12C) can coincide (Block A6).

As above, the tablet computer 10 is capable of performing efficient calibration of the touch screen display 12 without requiring the user to perform touch operation again and again for collecting as much data as possible.

It should be noted that, in a conventional calibration technique in which objects such as dots or crosses marks are displayed on a touch screen display for prompting a user's touch operation thereon, four objects are generally displayed on the touch screen display at its upper left part, lower left part, upper right part, and lower right part for collecting four data without bias and the correction value is calculated based on the four data. In the tablet computer 10 of the present embodiment, a plurality of objects a1 may be interspersed throughout the touch screen display 12 as shown in FIG. 11 to eliminate regional bias on the touch screen display 12. That is, the number of objects a1 displayed on the touch screen display 12 in the tablet computer 10 is not limited to one.

Furthermore, in the above description, the two line segments represented by the object a1 are, for easier understanding, given as vertical and horizontal line segments corresponding to X-axis and Y-axis setting coordinates on the touch screen display 12; however, the line segments are not limited thereto. The correction value can be calculated from any two or more line segments which are not parallel to one another using the deviation components extracted from each of the line segments. Thus, as shown in FIG. 12, both line segments may not correspond to X-axis or Y-axis ("A" in FIG. 12). The two segments may not cross each other ("B" in FIG. 12).

Furthermore, as another application of the technical concept of collecting a plurality of data from the writing of line segments for the calibration, an object (g1) for writing a figure whose central point can be calculated such as a circle as "C" shown in FIG. 12 may be displayed, and a deviation between the central point (g2) of the object (g1) and the central point (g3) calculated from a written figure (figure tracing the object) may be set as the correction value for the calibration. That is, the line segment is not limited to a straight line.

The operation of each embodiment is achievable by software (program). Thus, when the software is installed in a computer through a computer-readable storage medium storing the software and executed, the same advantage obtained from each embodiment is easily achievable.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising: a touch screen comprising a detection coordinate system that detects a touch; a display processor configured to display on the touch screen line segment based on a display coordinate system; a detector processor configured to detect coordinates of a first stroke indicative of a trace of the line segment on the touch screen; and a controller configured to: exclude a part of the coordinates of the first stroke when the number of detected coordinates included in a first area satisfies a threshold; and set a correction value for correcting a difference between the display coordinate system and the detection coordinate system by using a positional relationship between the display position of the line segment and another part of the coordinates of the first stroke that have not been excluded, wherein lengths of the line segment and a second line segment are set to such a range that a variation of an angle formed by a writing object and a surface of the touch screen is less than a first value.

2. The apparatus of claim 1, wherein the display processor is further configured to display on the touch screen a second line segment which is arranged at a non-zero angle to the line segment based on the display coordinate system, and the detector processor is further configured to detect second coordinates of a second stroke indicative of a trace of the second line segment on the touch screen.

3. The apparatus of claim 2, wherein the controller is further configured to set the correction value by using a positional relationship between the display position of the second line segment and at least part of the second coordinates.

4. The apparatus of claim 1, wherein the controller is further configured to: determine whether the first stroke is valid, and set the correction value by using at least part of the coordinates of the first stroke which is determined as valid.

5. The apparatus of claim 1, wherein the first area is in a vicinity of a start point or a finish point of the first stroke.

6. A calibration method for an electronic apparatus, the method comprising: displaying on a touch screen comprising a detection coordinate system that detects a touch, a line segment based on a display coordinate system; detecting coordinates of a first stroke indicative of a trace of the line segment on the touch screen; excluding a part of the coordinates of the first stroke when the number of detected coordinates included in a first area satisfies a threshold; and setting a correction value for correcting a difference between the display coordinate system and the detection coordinate system by using a positional relationship between the display position of the line segment and another part of the coordinates of the first stroke that have not been excluded, wherein lengths of the line segment and a second line segment are set to such a range that a variation of an angle formed by a writing object and a surface of the touch screen is less than a first value.

7. The method of claim 6, further comprising:
displaying on the touch screen a second line segment which is arranged at a non-zero angle to the line segment based on the display coordinate system, and
detecting second coordinates of a second stroke indicative of a trace of the second line segment on the touch screen.

8. The method of claim 7, further comprising:
setting the correction value by using a positional relationship between the display position of the second line segment and at least part of the second coordinates.

9. The method of claim 6, further comprising determining whether the first stroke is valid, wherein the correction value is set by using at least part of the coordinates of the first stroke which is valid.

10. The method of claim 7, wherein directions of the line segment and the second line segment corresponds to X-axis and Y-axis of the touch screen display.

11. The method of claim 7, wherein at least one direction of the line segment and the second line segment does not correspond to X-axis or Y-axis of the touch screen display.

12. The method of claim 7, wherein the line segment and the second line segment are arranged to cross each other.

13. The method of claim 7, wherein the line segment and the second line segment are arranged not to cross each other.

14. A computer-readable, non-transitory storage medium having stored thereon a computer program which is executable by a computer, the computer program controlling the computer to function as: a display processor configured to display on a touch screen comprising a detection coordinate system that detects a touch, a line segment based on a display coordinate system; a detector processor configured to detect coordinates of a first stroke indicative of a trace of the line segment on the touch screen; and a controller configured to: exclude a part of the coordinates of the first stroke when the number of detected coordinates included in a first area satisfies a threshold; and set a correction value for correcting a difference between the display coordinate system and the detection coordinate system by using a positional relationship between the display position of the line segment and another part of the coordinates of the first stroke that have not been excluded, wherein lengths of the line segment and a second line segment are set to such a range that a variation of an angle formed by a writing object and a surface of the touch screen is less than a first value.

15. The medium of claim 14, wherein: the display processor is further configured to display on the touch screen a second line segment which is arranged at a non-zero angle to the line segment based on the display coordinate system, and the detector processor is further configured to detect second coordinates of a second stroke indicative of a trace of the second line segment on the touch screen.

16. The medium of claim 15, wherein the controller is further configured to set the correction value by a positional relationship between the display position of the second line segment and at least part of the second coordinates.

17. The medium of claim 14, wherein the controller is further configured to determine whether the first stroke is valid, and set the correction value by using at least part of the coordinates of the first stroke which is valid.

\* \* \* \* \*